United States Patent [19]

Kiyono

[11] Patent Number: 4,927,221

[45] Date of Patent: May 22, 1990

[54] BALANCED LIGHTWAVE TRANSMISSION SYSTEM

[75] Inventor: Mikio Kiyono, Tokyo, Japan

[73] Assignee: NEC Corporation, Japan

[21] Appl. No.: 267,020

[22] Filed: Nov. 4, 1988

[30] Foreign Application Priority Data

Nov. 7, 1987 [JP] Japan .................... 62-280318

[51] Int. Cl.⁵ .............................. G02B 6/10
[52] U.S. Cl. .................... 350/96.14; 350/96.15; 455/612; 455/618
[58] Field of Search .......... 455/610, 612, 608, 613, 455/617, 618, 619; 250/227; 350/96.10, 96.11, 96.12, 96.13, 96.14, 96.15, 96.16

[56] References Cited

U.S. PATENT DOCUMENTS

| | | | |
|---|---|---|---|
| 4,648,134 | 3/1987 | Stewart | 455/619 |
| 4,831,663 | 5/1989 | Smith | 455/616 |
| 4,833,668 | 5/1989 | Rowley et al. | 370/1 |
| 4,856,093 | 8/1989 | Mohr | 455/619 |

Primary Examiner—Frank Gonzalez
Attorney, Agent, or Firm—Laff, Whitesel, Conte & Saret

[57] ABSTRACT

In a lightwave transmission system for transmitting a digital signal from a transmitter to a receiver through a lightwave guide, in order to enable to transmit a digital signal having a DC component, a constant light beam is switched over to one of two parallel lightwave conductors by an optical directional coupling switch in response to the digital signal so that the parallel light wave conductors form a balanced lightwave guide to transmit the digital information signal as balanced optical signals. Two photo sensors are disposed at output ends of the two lightwave conductors and sense the balanced optical signals transmitted through the lightwave conductors to produce balanced electric signals which are, in turn, compared at a comparator to reproduce the digital signal.

1 Claim, 2 Drawing Sheets

BALANCED LIGHTWAVE TRANSMISSION SYSTEM

BACKGROUND OF THE INVENTION:

1. Field of the Invention

The present invention relates to a lightwave trransmission system and, in particular, to a lightwave transmission system of a balanced type which is adaptable for an optical digital interface for connecting between electronic devices.

2. Description of the Prior Art

In the prior art, the lightwave transmission system is used as an optical interface to transmit a digital signal from an electronic device to another electronic device.

As a conventional lightwave transmission system, an unbalanced type is used which is shown in, for example, a paper by T.L. MAIONE et al entitled "PRACTICAL 45-Mb/s REGENERATOR FOR LIGHTWAVE TRANSMISSION", THE BELL SYSTEM TECHNICAL JOURNAL, JULY-AUGUST 1978, p.p. 1837–1855 (Reference 1). In the unbalanced type lightwave transmission system, an electric digital signal is converted to an optical signal at a transmitter. The optical signal is transmitted through an optical fiber to a receiver. The receiver converts the received optical signal into an electrical signal as an output signal and maintains a constant output level by automatic gain control (AGC). The output signal is compared with a reference level to reproduce the electric digital signal. The reference I illustrates a one-way repeater comprising the receiver and the transmitter.

The AGC circuit comprises a peak detecting circuit for detecting a peak level of the output signal and an AGC signal generator responsive to the detected peak level for producing the AGC signal.

Generally speaking, digital signals are classified into a type such as an RZ signal having no DC component and another type such as an NRZ signal having a DC component.

When the digital signal has a DC component, it is hard to detect the peak level so that the AGC cannot be performed. Therefore, the conventional unbalanced lightwave transmission system cannot be used in an optical digital interface for transmitting the digital signal having a DC component.

SUMMARY OF THE INVENTION:

Accordingly, an object of the present invention is to provide a lightwave transmission system wherein the digital signal having a DC component is also reliably decided without use of the AGC technique in the receiver side.

According to the present invention, a balanced lightwave transmission system can be obtained which comprises: light source means for emitting a light beam; light source driving means for driving the light source means to emit the light beam constantly; optical directional coupling switch means having an input port optically coupled with the light source means for receiving the light beam as an input light beam and a first and a second output port for delivering a first and a second output light signal, the optical directional coupling switch means responsive to a control signal for delivering the input light beam to one of the first and second output ports as one of the first and second output light signals; control signal generating means responsive to a digital signal to be transmitted for producing the control signal which selectively takes one of a first and a second voltage level so that the input light beam is delivered to the first output port as the first output light signal when the control signal takes the first voltage level while the input light beam is delivered to the second output port as the second output light signal when the control signal takes the second voltage level; first and second parallel lightwave guide means having a first and a second input terminal end which are optically coupled with the first and second output ports, respectively, and having a first and a second output terminal ends, respectively, for transmitting the first and second output light signals as a first and a second optical signal, respectively; first and second photo sensing means optically coupled with the first and second output terminal ends, respectively, for converting the first and second optical signals into a first and a second electric signal, respectively; and comparing means coupled with the first and second photo sensing means for comparing the first and second electric signals to reproduce the digital signal as an output electric signal of the comparing means.

DESCRIPTION OF PREFERRED EMBODIMENT

Prior to description of an embodiment of the present invention, a known lightwave transmission system will be described for better understanding of the present invention.

Figure 1:
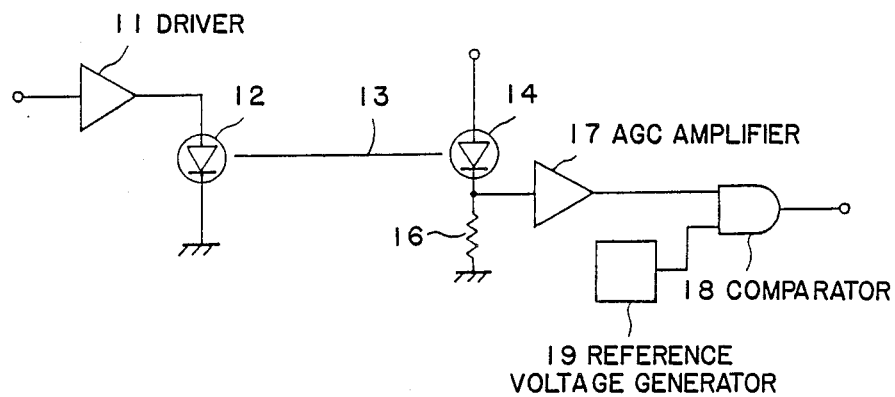
FIG. 1 is a block diagram illustrating a known lightwave transmission system.

Referring to FIG. 1, the known system comprises a driver 11 connected to a laser diode 12 so that the laser diode 12 is driven by that electric signal from the driver 11 which should be transmitted. The laser diode 12 is coupled with a photo diode 14 through a single optical fiber 13 for transmitting an optical signal corresponding to the electric signal. The photo diode 14 is for converting the optical signal into an electrical signal as a received signal and is ground through a load resistor 16. The photo diode 14 has a plate which is connected to a comparator 18 through an AGC amplifier 17. A reference voltage generating circuit 19 is connected to the comparator 18.

In the above-described lightwave transmission system, a received optical power level at the photo diode 14 varies in dependence on variation of an optical power emitted from the laser diode 12 and a length of the optical fiber 13. Therefore, a voltage of the received signal considerably deviates in response to variation of the received optical power level.

When the received signal varies in the voltage level as described above, it is impossible to correctively decide the voltage level of the received signal.

Accordingly, the known light transmission system is provided with the AGC amplifier 17 so that the received signal voltage is always controlled to be constant in no relation to variation of the received optical power.

However, the known lightwave transmission system has a problem as described in the preamble.

Now, description is made as to an embodiment according to the present invention.

Figure 2:
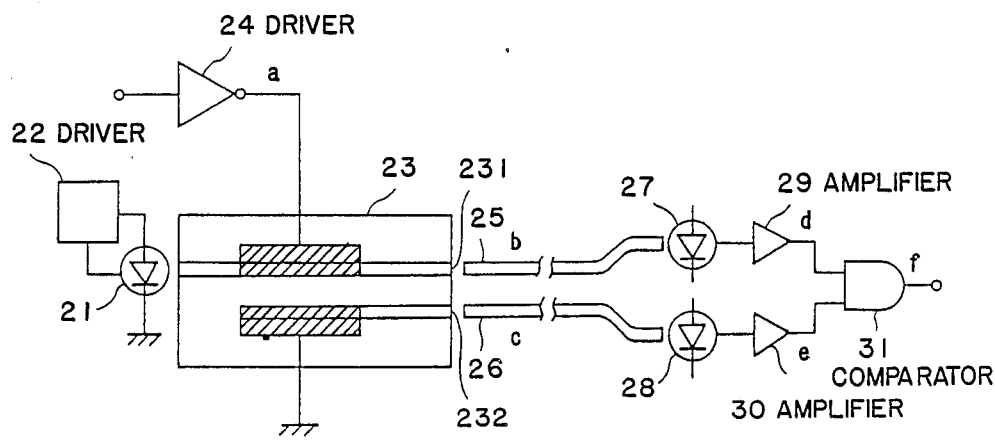
FIG. 2 is a block diagram illustrating a balanced lightwave transmission system according to a embodiment of the present invention.
Figure 3A:
FIG. 3 is a view illustrating waveforms at various points in the circuit of FIG. 2.
Figure 3B:
Figure 3C:
Figure 3D:
Figure 3E:
Figure 3F:

FIG. 2 shows a lightwave transmission system according to an embodiment of the present invention.

Referring to FIG. 2, a laser diode 21 as a light source for an optical communication is constantly illuminated by a driver circuit 22. The laser diode 21 is optically coupled with an input terminal of an optical directional coupling switch 23. The switch 23 is driven by a driver 24 which is a control signal generating means for generating a control signal for controlling the switch 23. The control signal is generated by a digital signal which should be transferred through the lightwave transmission system.

The optical directional coupling switch 23 has a pair of output ports 231 and 232 which are coupled to optical fibers 25 and 26. Two photo diodes 27 and 28 are coupled to output terminal ends of the optical fibers 25 and 26, respectively. Amplifiers 29 and 30 are also connected to the photo diodes 27 and 28, respectively. Outputs of the amplifiers 29 and 30 are connected to input terminals of a comparator 31.

Referring to FIG. 3 additionally, the control signal, which is applied from the driver 24 to the optical directional coupling switch 23, has a waveform shown at a in FIG. 3. Two waveforms b and c in FIG. 3 are of optical signals which are transmitted from the output ports 231 and 232 of the optical directional coupling switch 23 to diodes 27 and 28 through optical fibers 25 and 26, respectively. Two waveforms d and e are of electrical output signals of the amplifiers 29 and 30. The other waveform f is of an output signal of the comparator 31.

A light beam from the laser diode 21 constantly driven is selectively switched over the optical fibers 25 and 26 by the optical directional coupling switch 23 in response to the control signal from the driver 24.

In this connection, the control signal selectively takes one of a first (or high) and a second (or low) voltage level as shown at a in FIG. 3. The optical directional coupling switch 23 delivers the input light beam to the second output port 232 when the control signal a takes the second or low voltage level. On the other hand, the optical directional coupling switch 23 delivers the input light beam to the first output port 231 when the control signal a takes the first or high voltage level. Therefore, optical signals b and c are logically reversed in phase and are present at the output ports 231 and 232 of the optical directional coupling switch 23, respectively. So that a balanced light transmitter is made up of laser diode 21, driver 22, optical directional coupling switch 23 and driver 24. The optical signals are transmitted through the two optical fibers 25 and 26 and are converted into electric signals by the photo diodes 27 and 28, respectively. The electric signals are amplified by amplifiers 29 and 30 as the received signals, respectively. The resultant received signals (waveforms d and e) are signals which are balanced to each other. The balanced signals are converted by the comparator 31 into a usual logical signal (waveform f) as a reproduced signal of the digital signal at the driver 24.

An example of the optical directional coupling switch is disclosed in a paper by M. Kondo et al entitled "Fiber-Coupling Loss and Drive Voltage Simultaneous Reductions by Tapered Titanium-thickness Diffusion in LiNbO₃ Waveguide Switches", TECHNICAL DIGEST of SEVENTH TOPICAL MEETING ON INTEGRATED AND GUIDED-WAVE OPTICS, April 24–26, 1984 (Reference 2), or a paper by RONALD V. SCHMIDT et al, entitled "Directional Coupler Switches, Modulators, and Filters Using Alternating $\Delta\beta$ Techniques" in IEEE TRANSACTIONS ON CIRCUITS AND SYSTEMS, VOL. CAS-26, NO. 12, DECEMBER 1979 (Reference 3).

In the present invention as described above, a balanced light transmitter is formed by use of the optical directional coupling switch and the light source for the communication to thereby form a balanced light transmission system. Therefore, the balanced signals can be obtained at a receiving side of the light transmission system with a constant deciding level. Accordingly, the present system can allow an increased variation of the received light power, that is, tolerance in variation in comparison with the known lightwave transmission system having the AGC amplifier.

What is claimed is:

1. A balanced lightwave transmission system comprising:

light source means for emitting a light beam;

light source driving means for driving said light source means to emit said light beam constantly;

optical directional coupling switch means having an input port optically coupled with said light source means for receiving said light beam as an input light beam and a first and a second output port for delivering a first and a second output light signal, said optical directional coupling switch means responsive to a control signal for delivering said input light beam to one of said first and second output ports as one of said first and second output light signals;

control signal generating means responsive to a digital signal to be transmitted for producing said control signal which selectively takes one of a first and a second voltage level so that said input light beam is delivered to said first output port as said first output light signal when said control signal takes said first voltage level while said input light beam is delivered to said second output port as said second output light signal when said control signal takes said second voltage level;

first and second parallel lightwave guide means having a first and a second input terminal end which are optically coupled with said first and second output ports, respectively, and having a first and a second output terminal end, respectively, for transmitting said first and second output light signals as a first and a second optical signal, respectively;

first and second photo sensing means optically coupled with said first and second output terminal ends, respectively, for converting said first and second optical signals into a first and a second electric signal, respectively; and comparing means coupled with said first and second photo sensing means for comparing said first and second electric signals to reproduce said digital signal as an output electric signal of said comparing means.

* * * * *